US009217874B2

United States Patent
Kasano et al.

(10) Patent No.: US 9,217,874 B2
(45) Date of Patent: Dec. 22, 2015

(54) IMAGE DISPLAY APPARATUS

(71) Applicant: Panasonic Intellectual Property Management Co., Ltd., Osaka (JP)

(72) Inventors: Masahiro Kasano, Osaka (JP); Yasuhiro Tanaka, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/584,319

(22) Filed: Dec. 29, 2014

(65) Prior Publication Data

US 2015/0116613 A1 Apr. 30, 2015

Related U.S. Application Data

(63) Continuation of application No. PCT/JP2014/001677, filed on Mar. 24, 2014.

(30) Foreign Application Priority Data

Mar. 26, 2013 (JP) .................................. 2013-063467

(51) Int. Cl.
*G02F 1/135* (2006.01)
*G02B 27/22* (2006.01)
(Continued)

(52) U.S. Cl.
CPC ............ *G02B 27/2214* (2013.01); *G02F 1/137* (2013.01); *G02F 1/29* (2013.01);
(Continued)

(58) Field of Classification Search
CPC ....... G02F 1/1343; G02F 1/133; G02B 27/22; G02B 27/2214
See application file for complete search history.

(56) References Cited

U.S. PATENT DOCUMENTS 8,963,808 B2 * 2/2015 Gollier ............... G02B 27/2214
348/54
2011/0199548 A1 8/2011 Takama
(Continued)

FOREIGN PATENT DOCUMENTS

| JP | 2009-169069 | 7/2009 |
| JP | 2010-113064 | 5/2010 |
| JP | 2011-164527 | 8/2011 |
| JP | 2012-18349 | 1/2012 |

(Continued)

OTHER PUBLICATIONS

International Search Report issued Jun. 10, 2014 in International (PCT) Application No. PCT/JP2014/001677.

*Primary Examiner* — Dung Nguyen
(74) *Attorney, Agent, or Firm* — Wenderoth, Lind & Ponack, L.L.P.

(57) ABSTRACT

An image display apparatus according to the present disclosure includes: a display panel having at least, first pixels that display a first parallax image and second pixels that display a second parallax image; and an image conversion element. The image conversion element includes: a plurality of first electrodes arranged at a predetermined pitch; a second electrode; and a liquid crystal layer. The image display apparatus according to the present disclosure simultaneously satisfies the following conditions, wherein f is a distance from the liquid crystal layer to the first pixels or the second pixels, r is a length equal to ½ of an arrangement pitch of the first electrodes, Δn is a birefringence of the liquid crystal molecules, P is an arrangement pitch of the first pixels and the second pixels, and d is a thickness of the liquid crystal layer:

$$f \geq 5P \quad (1)$$

$$\Delta n < \frac{r^2}{2d \cdot f}. \quad (2)$$

2 Claims, 6 Drawing Sheets

(51) Int. Cl.
*G02F 1/29* (2006.01)
*G02F 1/137* (2006.01)
G02B 27/26 (2006.01)
G02F 1/1343 (2006.01)
G02F 1/133 (2006.01)
G02B 27/28 (2006.01)

(52) U.S. Cl.
CPC .............. *G02B 27/22* (2013.01); *G02B 27/2221* (2013.01); *G02B 27/26* (2013.01); *G02B 27/28* (2013.01); *G02F 1/13306* (2013.01); *G02F 1/134309* (2013.01); *G02F 2001/134381* (2013.01); *G02F 2001/294* (2013.01)

(56) References Cited

U.S. PATENT DOCUMENTS

| | | |
|---|---|---|
| 2012/0008057 A1 | 1/2012 | Takahashi et al. |
| 2012/0314144 A1 | 12/2012 | Sugita et al. |
| 2013/0342664 A1 | 12/2013 | Smith et al. |
| 2014/0085439 A1* | 3/2014 | Niwano ............. H04N 13/0475 348/56 |

FOREIGN PATENT DOCUMENTS

| | | |
|---|---|---|
| JP | 2012-252293 | 12/2012 |
| WO | 2012/121406 | 9/2012 |

* cited by examiner

IMAGE DISPLAY APPARATUS

CROSS-REFERENCE TO RELATED APPLICATION

This application is a Continuation of International Application No. PCT/JP2014/001677, filed on Mar. 24, 2014, which in turn claims the benefit of Japanese Application No. 2013-063467, filed on Mar. 26, 2013, the disclosures of which Applications are incorporated by reference herein.

BACKGROUND

1. Field

The present disclosure relates to an image display apparatus such as a liquid crystal display.

2. Description of the Related Art

Japanese Laid-Open Patent Publication No. 2012-018349 discloses a display including a liquid crystal lens array element. The liquid crystal lens array element is a liquid crystal element having a lens effect. The display disclosed in Japanese Laid-Open Patent Publication No. 2012-018349 controls the lens effect in each of areas on a screen in accordance with a display mode of the area.

SUMMARY

The present disclosure provides an image display apparatus at is able to improve light converging characteristics when an image is displayed.

An image display apparatus according to the present disclosure includes: a display panel having, at least, first pixels that display a first parallax image and second pixels that display a second parallax image; and an image conversion element configured to deflect, in a predetermined direction, light outputted from the display panel. The image conversion element includes: a plurality of first electrodes arranged at a predetermined pitch; a second electrode disposed so as to oppose the first electrodes; and a liquid crystal layer which is disposed between the first electrodes and the second electrode and is composed of liquid crystal molecules having an isotropic refractive index. The refractive index of the liquid crystal layer varies when an arrangement direction of the liquid crystal molecules along a longitudinal direction thereof is changed due to an electric field formed between the first electrodes and the second electrode. The image display apparatus according to the present disclosure simultaneously satisfies the following conditions:

$$f \geq 5P \quad (1)$$

$$\Delta n < \frac{r^2}{2d \cdot f} \quad (2)$$

where f is a distance (mm) from the liquid crystal layer to the first pixels or the second pixels, r is a length (mm) equal to ½ of an arrangement pitch of the first electrodes, $\Delta n$ is a birefringence of the liquid crystal molecules, P is an arrangement pitch (mm) of the first pixels and the second pixels, and d is a thickness (mm) of the liquid crystal layer.

An image display apparatus according to the present disclosure is effective in improving light converging characteristics when an image is displayed.

DETAILED DESCRIPTION

Hereinafter, an embodiment be described in detail with appropriate reference to the drawings. It is noted that a more detailed description than need may be omitted. For example, the detailed description of already well-known matters and the overlap description of substantially same configurations may be omitted. This is to avoid an unnecessarily redundant description below and to facilitate understanding of a person skilled in the art.

It is noted that the inventors provide the accompanying drawings and the following description in order that a person skilled in the art may fully understand the present disclosure, and do not intend to limit the subject matter defined by the claims.

EMBODIMENT

Hereinafter, an embodiment will be described with reference to FIGS. 1 to 4.

Figure 1:
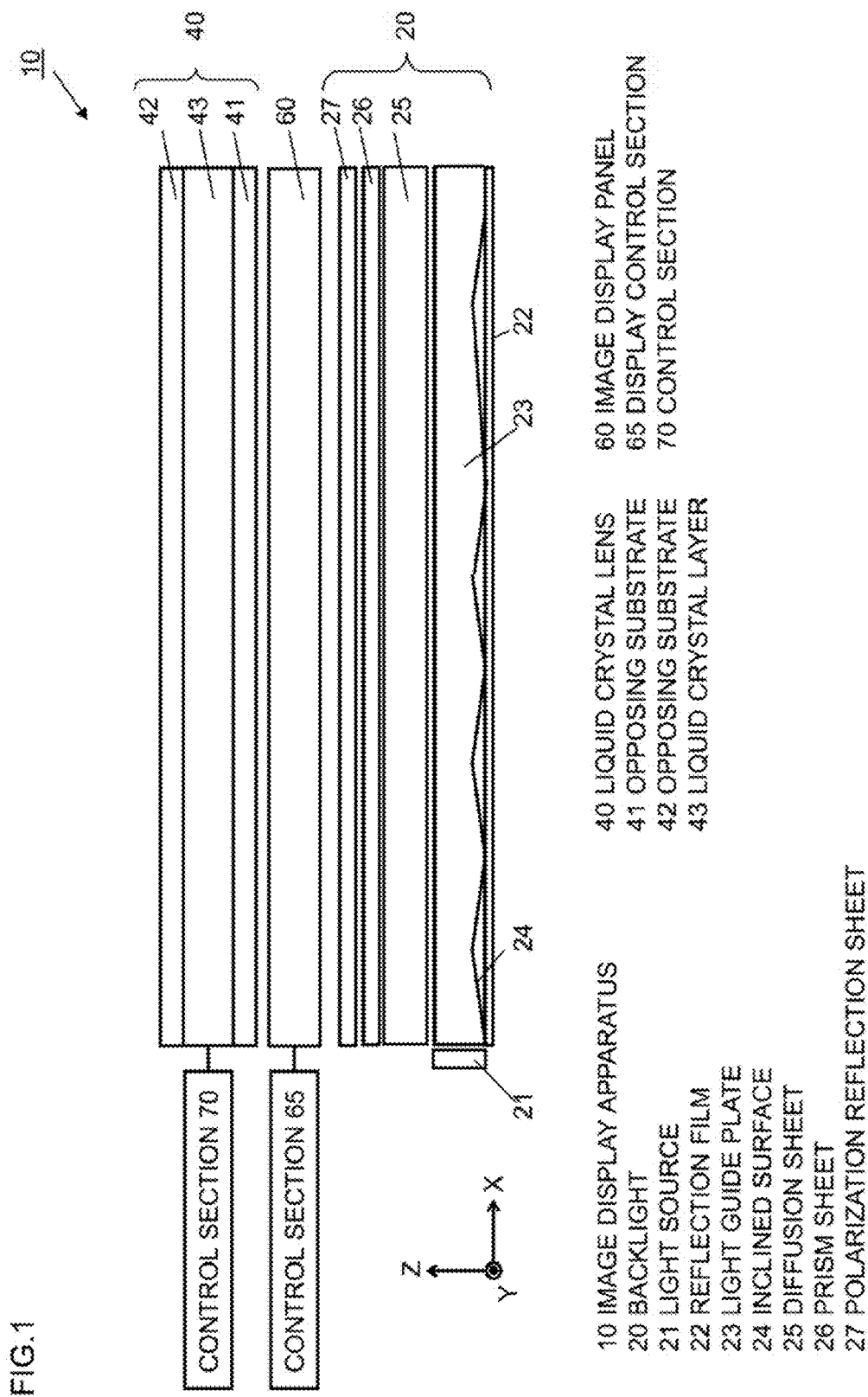
FIG. 1 is a schematic configuration diagram showing an image display apparatus according to an embodiment.

FIG. 1 is a schematic cross-sectional view of an image display apparatus 10 according to the embodiment. In the present embodiment, a three-dimensional orthogonal coordinate system is set for the image display apparatus 10, and a direction is specified by using coordinate axes.

Figure 2:
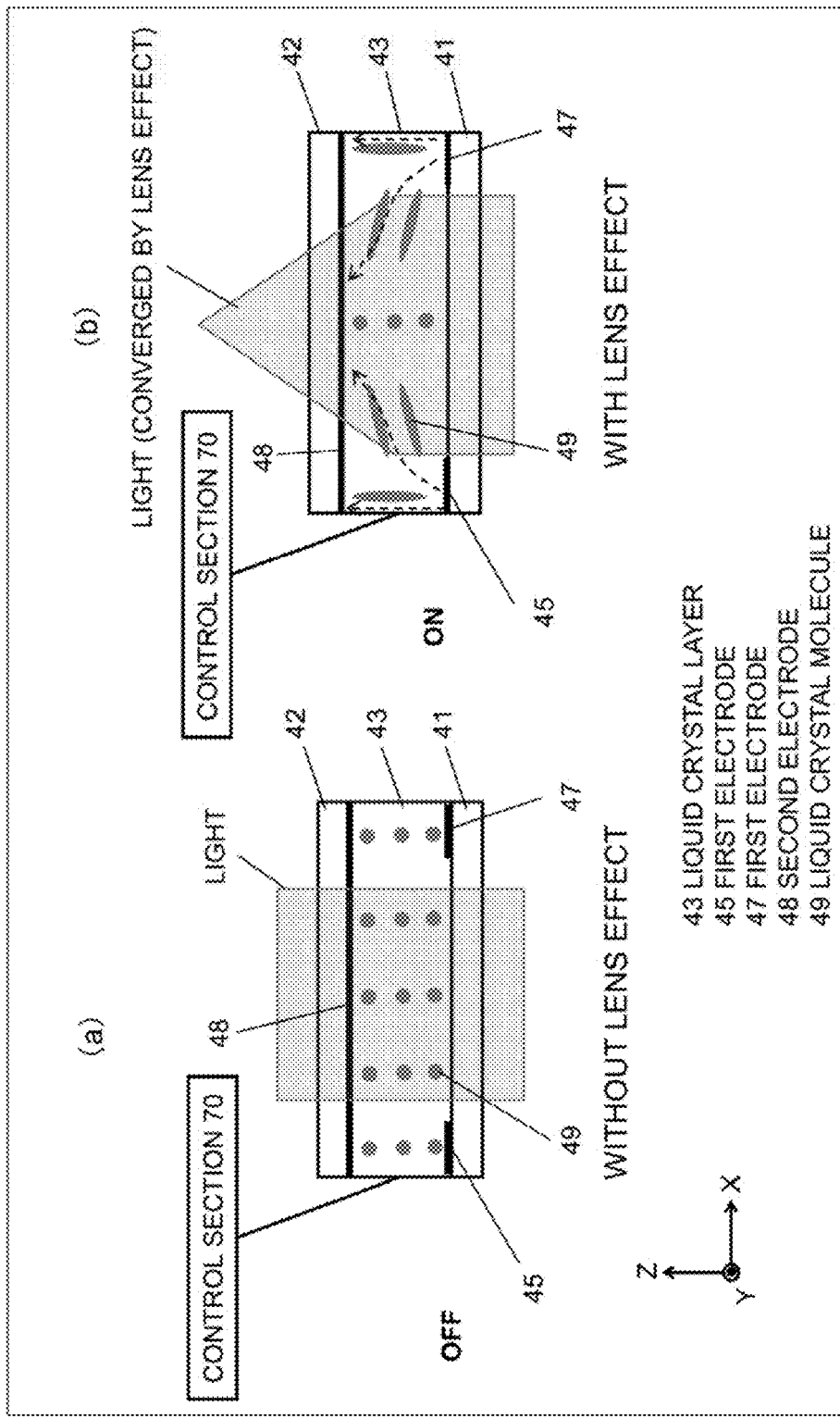
FIG. 2 is a schematic cross-sectional view of a liquid crystal lens according to the embodiment.
Figure 3:
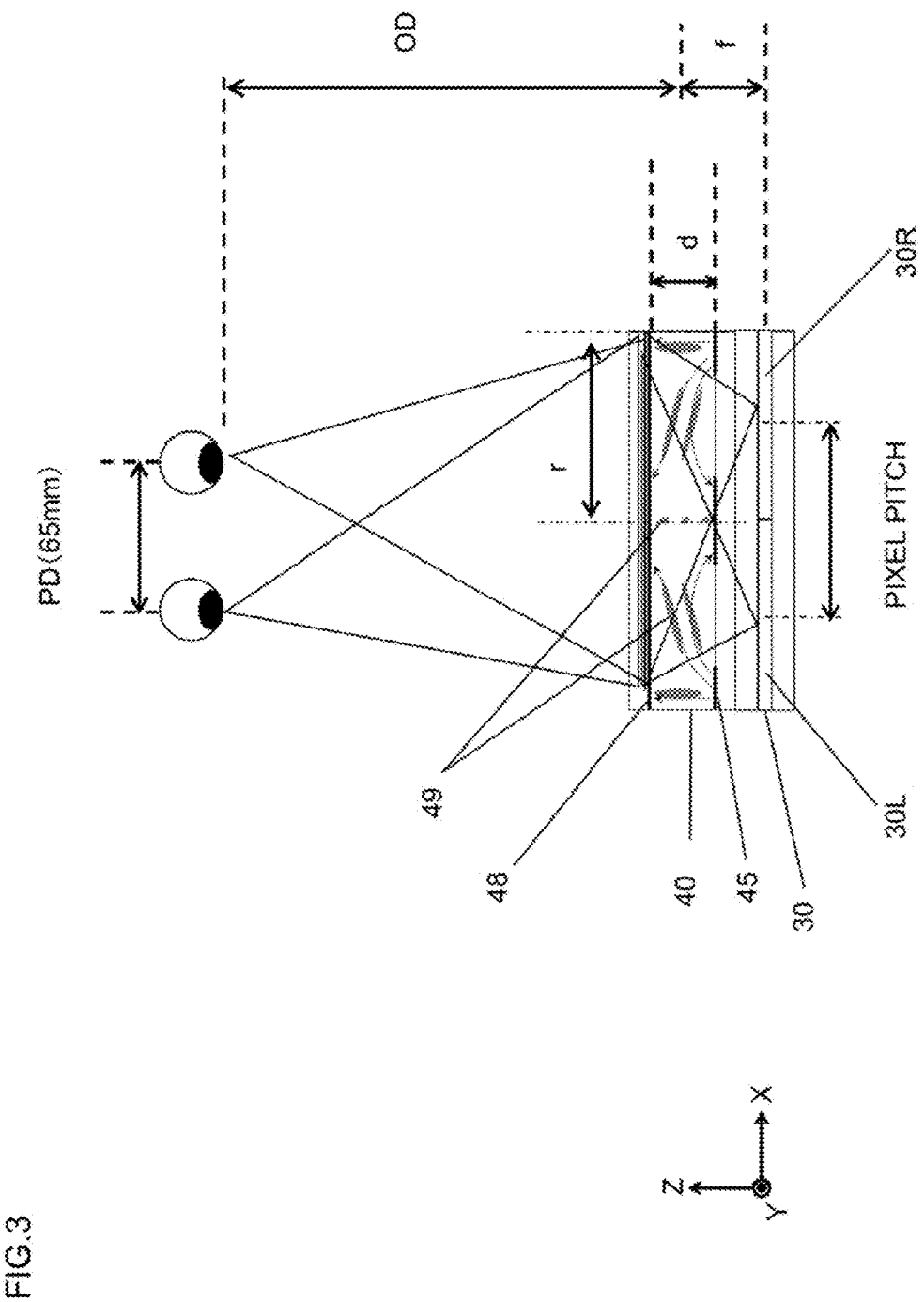
FIG. 3 is a schematic cross-sectional view of the image display apparatus according to the embodiment.

As shown in FIGS. 1 to 3, an X axis direction coincides with a right-left direction (horizontal direction) when a viewer faces a display surface of an image display panel 60. A Y axis direction coincides with an up-down direction when the viewer faces the display surface of the image display panel 60. A Z axis direction coincides with a direction perpendicular to the display surface of the image display panel 60. Here, "facing" means that the viewer is present directly in front of the display surface such that, for example, when a letter of "A" is displayed on the display surface, the viewer sees the letter of "A" from a correct direction. In addition, FIGS. 1 to 3 correspond to views as seen from above the image display apparatus 10. Thus, the left side in FIG. 1 corresponds to the right side of the display screen viewed from the viewer side.

As shown in FIG. 1, the image display apparatus 10 includes a backlight 20, the image display panel 60 that is able to display a 2D image and a 3D image, a liquid crystal lens 40, a display control section 65 that controls the image display panel 60, and a control section 70 that controls the liquid crystal lens 40. The liquid crystal lens 40 is an example of an image conversion element. Hereinafter, each component will be described in detail.

The backlight 20 includes a light source 21, a reflection film 22, a light guide plate 23 having inclined surfaces 24, a diffusion sheet 25, a prism sheet 26, and a polarization reflection sheet 27. The reflection film 22 is provided at a lower surface side (a back surface side) of the light guide plate 23, and the diffusion sheet 25 is provided at an upper surface side (a front surface side) of the light guide plate 23.

The light source 21 is arranged along one side surface of the light guide plate 23. The light source 21 includes a plurality of LED elements arranged in the Y axis direction.

Light emitted from the light source 21 spreads in the light guide plate 23 while being repeatedly totally reflected at the upper surface and the lower surface of the light guide plate 23. Light having an angle ;surpassing the total reflection angle within the light guide plate 23 is emitted from the upper surface of the light guide plate 23. The lower surface of the light guide plate 23 is composed of a plurality of inclined surfaces 24 as shown in FIG. 1. By these inclined surfaces 24, light propagating in the light guide plate 23 is reflected in various directions, and thus the intensity of the light emitted from the light guide plate 23 becomes uniform across the entire upper surface.

The reflection film 22 is provided on the lower surface side of the light guide plate 23. Light having an angle surpassing the total reflection angles of the inclined surfaces 24 provided in the lower surface of the light guide plate 23 is reflected by the reflection film 22, enters the light guide plate 23 again, and is eventually emitted from the upper surface. The light emitted from the light guide plate 23 enters the diffusion sheet 25.

The diffusion sheet 25 is a film-like member having minute projections and recesses provided on its surface. The thickness of the diffusion sheet 25 is about 0.1 to 0.3 mm. A diffusion plate having a plurality of beads therein may be used instead of the diffusion sheet 25. The diffusion plate is thicker than the diffusion sheet 25, and thus has an effect of spreading light in the plane direction therein. Meanwhile, the diffusion sheet 25 has a small effect of spreading light in the plane direction since the diffusion sheet 25 is thinner than the diffusion plate, but the diffusion sheet 25 is able to scatter light by the projections and the recesses on its surface. In addition, use of the diffusion sheet 25 also allows reduction in the thickness of the image display apparatus 10 in the Z axis direction.

The prism sheet 26 has a countless number of minute prism arrays on one surface of a transparent film, The prism sheet 26 reflects part of light and transmits the rest. The prism sheet 26 gives, to the transmitted light, relatively strong directivity in the normal direction of the prism sheet 26. Thus, the prism sheet 26 brightly illuminates in an effective direction with a small amount of light.

The polarization reflection sheet 27 is a member specific to a backlight for a liquid crystal panel, transmits light of a component in a polarization direction, which is transmitted through the liquid crystal panel, and reflects the other components. The reflected light becomes unpolarized when being reflected on another optical member or the reflection film 22 provided on the back surface of the light guide plate 23, and enters the polarization reflection sheet 27 again, and the transmitted and polarized component passes through the polarization reflection sheet 27. By repeating this, the polarized components of the incident light are uniformed as polarized components to be used effectively in the liquid crystal panel and are emitted to the liquid crystal panel side.

Light emitted from the backlight 20 enters the image display panel 60. The light that has entered the image display panel 60 is emitted to the liquid crystal lens 40 side.

A sheet for uniforming polarization of light is formed on each of the incident surface and the emission surface of the image display panel 60. In the present embodiment, a polarization direction of light emitted from the image display panel is the Y axis direction. One example of the image display panel 60 is a liquid crystal panel using an in-plane-switching mode. However, another type of image display panel can be used as the image display panel 60.

The image display panel 60 is switched between 2D display and 3D display by the display control section 65. The image display panel 60 has a plurality of pixels. When a 3D image is displayed, the plurality of pixels are divided into right-eye pixels and left-eye pixels and used. The display control section 65 controls the image display panel 60 to display a right-eye image by using the right-eye pixels, and display a left-eye image by using the left-eye pixels. The right-eye image and the left-eye image are simultaneously displayed. The liquid crystal lens 40 causes the right-eye image to enter the right eye of the viewer and the left-eye image to enter the left eye of the viewer.

When 2D display is performed, the 2D image is displayed using all the pixels as in the conventional art. At this time, the liquid crystal lens 40 is controlled by the control section 70 so as not to act as a lens. Therefore, the 2D image passes through the liquid crystal lens 40 as it is and reaches the eyes of the viewer.

The liquid crystal lens 40 includes opposing substrates 41 and 42, and a liquid crystal layer 43 disposed between the substrates 41 and 42. The liquid crystal lens 40 will be described later in detail.

The control section 70 switches the value of a voltage applied to the liquid crystal lens 40 depending on 2D display or 3D display. When 3D display is performed, the control section 70 applies a voltage to the liquid crystal layer 43 such that the liquid crystal lens 40 has a lens effect. When 2D display is performed, the control section 70 controls the voltage such that the liquid crystal lens 40 does not have a lens effect. When 2D display is performed, the control section 70 may not apply a voltage to the liquid crystal lens 40, or may apply a voltage such that no lens effect is generated. The voltage to be applied may be appropriately determined according to the orientation of liquid crystal molecules in the liquid crystal layer 43. By controlling the applied voltage in this manner, when performing 2D display, light emitted from the image display panel 60 reaches the eyes of the viewer while the light distribution characteristics of the light are kept unchanged even when the light has passed through the liquid crystal lens 40. Meanwhile, when performing 3D image, light emitted from the image display panel 60 is deflected by the liquid crystal lens 40 such that light from the right-eye pixels is converged on the right eye of the viewer and light from the left-eye pixels is converged on the left eye of the viewer.

Orientation films are formed on the light emission surface of the opposing substrate 41 and the light incident surface of the opposing substrate 42. Each orientation film orients liquid crystal molecules such that the long axes of the liquid crystal molecules are parallel to the Y axis direction in a state where no voltage is applied to electrodes. However, the orientation films may not be provided if the orientation of the liquid crystal molecules can be kept uniform. Glass may be used as the materials of the opposing substrates 41 and 42.

The liquid crystal lens 40 can be produced by attaching together the opposing substrate 41 on which an electrode is formed and the opposing substrate 42 on which an electrode is formed, and injecting a liquid crystal between the opposing substrates 41 and 42.

Next, the liquid crystal lens 40 will be described in detail with reference to FIG. 2.

FIG. 2 is a schematic cross-sectional view of the liquid crystal lens according to the embodiment, and shows one lens portion formed in the liquid crystal lens. FIG. 2(*a*) shows the liquid crystal lens 40 when 2D display is performed, and FIG. 2(*b*) shows the liquid crystal lens 40 when 3D display is performed.

The liquid crystal lens 40 includes the pair of opposing substrates 41 and 42, the liquid crystal layer 43 sealed between the opposing substrates 41 and 42, first electrodes 45 and 47 provided on an inner surface (liquid crystal layer 43 side) of the opposing substrate 41, a second electrode 48 provided on an inner surface (liquid crystal layer 43 side) of the opposing substrate 42, an alignment film (not shown) provided on the light emission surface side of the opposing substrate 41, and an alignment film (not shown) provided on the light incident surface side of the opposing substrate 42. The liquid crystal layer 43 is composed of a plurality of liquid crystal molecules 49.

The first electrodes 45 and 47 are stripe-shaped electrodes extending in a direction (Y axis direction) perpendicular to a lens pitch direction (X axis direction). The stripe-shaped first electrodes 45 and 47 are repeatedly arranged at predetermined intervals in the X axis direction. In addition, the stripe-shaped first electrodes 45 and 47 are configured such that a voltage can be applied to each of the electrodes individually. On the other hand, the second electrode 48 is a plane electrode.

The liquid crystal lens 40 is an element that is able to control the orientation of transmitted light according to a voltage applied from the control section 70. Hereinafter, the principle will be described briefly.

First, birefringence will be described. Birefringence is a phenomenon that, when a light ray is transmitted through a certain substance, the light ray is split into two rays depending on the state of polarization of the incident light ray. The two rays are called an ordinary ray and an extraordinary ray, respectively. The birefringence Δn is a difference between ne and no. That is, ne is a refractive index for the extraordinary ray and may be referred to as an extraordinary ray refractive index, and no is a refractive index for the ordinary ray and may be referred to as an ordinary ray refractive index.

In general, the liquid crystal molecules 49 each have an ellipsoidal shape and has different dielectric constants in the longitudinal direction and the lateral direction thereof. Thus, the liquid crystal layer 43 has a birefringence property in which a refractive index is different for each polarization direction of incident light.

In addition, when the direction of the long axis orientation (director) of each liquid crystal molecule 49 relatively changes with respect to the polarization direction of light, the refractive index of the liquid crystal layer 43 changes. Thus, when the orientation of the liquid crystal molecule is changed by an electric field generated by applying a certain voltage, the refractive index for transmitted light changes. Thus, the liquid crystal layer 43 has the lens effect when a voltage is applied with an appropriate electrode configuration.

In the present embodiment, a uniaxial positive type liquid crystal is used as a material for forming the liquid crystal layer 43. Thus, as shown in FIG. 2(*a*), the longer axes of the liquid crystal molecules are oriented in the Y axis direction when no voltage is applied between the opposing electrodes.

Since the polarization direction of light from the image display panel 60 is the Y axis direction, the refractive index of the liquid crystal layer 43 in the case where no voltage is applied to the first electrodes 45 and 47 and the second electrode 48 is uniformly the extraordinary ray refractive index.

On the other hand, when a voltage is applied to the liquid crystal lens 40, for example, the voltage value of the first electrodes 45 and 47 is set at a voltage value V1 higher than a rising voltage Vth of the liquid crystal molecules, and the voltage value of the second electrode 48 is set at a ground potential V0. In this case, as shown in FIG. 2(*b*), near the first electrodes 45 and 47, the liquid crystal molecules 49 rise with respect to the electrode surface, so that the liquid crystal molecules 49 are oriented upward (in the Z axis direction). With decreasing distance to the lens center, the liquid crystal molecules 49 gradually become parallel to the Y axis.

The polarization direction of the light emitted from the image display panel 60 is parallel to the Y axis. Thus, the refractive index for the light emitted from the image display panel 60 is the ordinary ray refractive index no near the first electrodes 45 and 47, and increases with decreasing distance to the lens center. The refractive index becomes substantially the extraordinary ray refractive index ne at the lens center.

As a result, a refractive index distribution occurs in the liquid crystal layer 43. Since tight is deflected from a lower refractive index toward a higher refractive index, for example, light incident on the lens in parallel to the lens is deflected toward the lens center.

The control section 70 performs control such that no voltage is applied to the electrodes as shown in FIG. 2(a) when a 2D image is viewed while a voltage is applied to the electrodes as shown in FIG. 2(*b*) when a 3D image is viewed. Thus, when the 2D image is viewed, light incident on the liquid crystal lens 40 passes therethrough as it is without being subject to a lens effect. When the 3D image is viewed, light that has passed through the liquid crystal lens 40 is converged on the eyes of the viewer.

Figure 4:
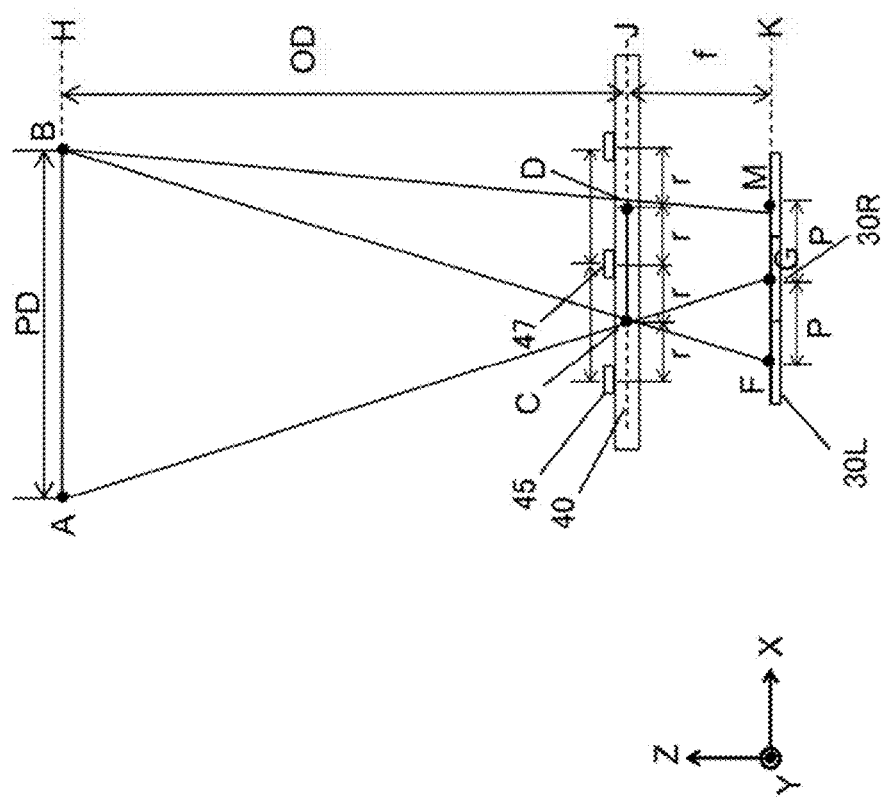
FIG. 4 is a schematic diagram illustrating the relationships among parameters according to the embodiment.

FIG. 3 is a schematic cross-sectional view of the image display apparatus according to the embodiment, and shows one lens portion formed in the liquid crystal lens 40. FIG. 4 is a schematic diagram illustrating the relationships among parameters shown in FIG. 3. Hereinafter, the parameters of the image display apparatus 10 will be described with reference to FIGS. 3 and 4. For the sake of easy-to-view illustration, the ratios between the parameters shown in FIG. 4 are different from the actual ratios.

First, the parameters shown in FIGS. 3 and 4 are defined as follows. The units of length are all "mm".

P: an arrangement pitch of a left-eye pixel 30L and a right eye pixel 30R in the X axis direction, r: a length equal to ½ of an arrangement pitch of the first electrodes 45 and 47, PD: an interval between the right eye and the left eye of the viewer, OD: a distance from the center of the liquid crystal lens 40 in the thickness direction thereof to the eyes of the viewer, f a distance from the center of the liquid crystal lens 40 in the thickness direction thereof to the pixels in the image display panel 60, d: a clearance between the opposing substrates 41 and 42, i.e., a thickness (cell gap) of the liquid crystal layer 43 of the liquid crystal lens 40, and Δn: birefringence of the liquid crystal molecules.

Here, "pixel" means a point or a combination of a plurality of points, having color information, on the image display panel 60. One point having color information may also be referred to as "sub pixel". In addition, each of the left-eye pixel 30L and the right eye pixel 30R may be composed of one pixel or a plurality of pixels, In a specific example, when one pixel is composed of three sub pixels of R, G, and B, each of the left-eye pixel 30L and the right eye pixel 30R may be composed of a set of R, G, B sub pixels (i.e., one pixel), or two or more sets of R, G, B sub pixels (i.e., two or more pixels). Alternatively, in another specific example, when a pixel is composed of one point having color information, each of the left-eye pixel 30L and the right eye pixel 30R may be composed of one point having color information (i.e., one pixel), or two or more points having color information (i.e., two or more pixels). Accordingly, the arrangement pitch P of the left-eye pixel 30L and the right eye pixel 30R is not a pitch of each pixel provided on the image display panel 60 but an arrangement pitch of an area where a right-eye pixel for displaying a right-eye image is provided and an area where a left-eye pixel for displaying a left-eye image is provided (refer to FIG. 3). In addition, the distances OD and f are distances in a direction perpendicular to the emission surface of the image display panel 60.

The image display apparatus 10 of the present embodiment is designed so as to satisfy the following equations (1) and (2) simultaneously:

$$f \geq 5P \tag{1}$$

$$\Delta n < \frac{r^2}{2d \cdot f} \tag{2}$$

When equations (1) and (2) are not simultaneously satisfied, occurrence of crosstalk is remarkable when a 3D image is viewed, and visibility of the image is reduced. Hereinafter, the reason for this will be described in detail.

In general, in a stereoscopic image display apparatus, the following relational equations (3) and (4) are satisfied. Equation (3) can be derived from base-to-height ratios of similar triangles CAB and CGF shown in FIG. 4. Further, expression (4) can be derived from a ratio between base and height of triangle BCD and a ratio between base and height of triangle BFM shown in FIG. 4.

$$OD \cdot P = PD \cdot f \tag{3}$$

$$r \cdot (OD + f) = P \cdot OD \tag{4}$$

When the above equations (3) and (4) are solved for r, equation (5) is obtained:

$$r = \frac{P}{1 + P/PD} \tag{5}$$

Further, an approximation of a focal length F of the liquid crystal lens is expressed by the following equation (6):

$$F = \frac{r^2}{2d(n_e - n_o)} \tag{6}$$

When the liquid crystal lens 40 is designed, it has conventionally been general practice to make the focal length F of the liquid crystal lens 40 substantially equal to the distance f between the liquid crystal lens 40 and the pixels. In this case, a liquid crystal material having relatively large Δn (=ne−no) has been used to make the cell gap d of the liquid crystal thin.

However, the inventors of the present disclosure has discovered that, in the image display apparatus of the conventional design, no crosstalk occurs when the viewing distance is short whereas crosstalk occurs when the viewing distance is increased. Crosstalk is a phenomenon that, for example, a part of light that should be converged on the left eye of a viewer enters the right eye of the viewer. When crosstalk occurs, the viewer recognizes unnecessary light, and cannot appropriately recognize an image displayed on the image display panel.

Specifically, no crosstalk occurred when the distance OD was 300 mm, but crosstalk occurred when the distance OD was 350 mm. Therefore, it is assumed that crosstalk occurs when the viewing distance OD exceeds 325 mm that is an intermediate value between 300 nm and 350 nm.

The viewing distance OD is expressed by the following equation (7) to which the above equation (3) is converted:

$$PD \cdot f/p = OD \tag{7}$$

In order to reduce crosstalk, the viewing distance OD needs to be equal to or larger than 325 mm when the interval PD between the right eye and the left eye is 65 mm. Therefore, the values of PD and OD are assigned to equation (7) to obtain the following equation (8):

$$65 \cdot f/P = OD \geq 325 \tag{8}$$

When equation (8) is converted, the following equation (9) is obtained:

$$65 \cdot f/P \geq 325 \tag{9}$$

When equation (9) is converted, the above equation (1) is obtained.

Further, in the conventional design, when the liquid crystal lens satisfies equation (1), the focal length of the liquid crystal lens is set to be equal to the distance f between the liquid crystal lens and the pixels. In the conventional design, since the refractive index distribution in the liquid crystal layer along the Z axis direction is not uniform, crosstalk occurs due to a sudden change in the refractive index near the first electrodes 45 and 47. Therefore, in the present embodiment, the refractive index of the liquid crystal material is designed so as to satisfy the following equation (10):

$$f < F \tag{10}$$

When equation (6) is assigned to equation (10), the following equation (11) is obtained:

$$f < \frac{r^2}{2d(n_e - n_o)} \tag{11}$$

Here, ne−no=Δn. When this equation is assigned to equation (11) and equation (11) is solved for Δn, the above equation (2) is obtained.

When the liquid crystal lens 40 is designed so as to satisfy equation (2) while satisfying equation (1), occurrence of crosstalk can be suppressed even when the viewing distance is increased.

As a result, the image display apparatus 10 of the present embodiment can achieve excellent light converging characteristics. In the present embodiment, the case has been described in which light can be converged on two viewpoints (i.e., the positions of the right eye and the left eye of the viewer). However, also in an image display apparatus capable of converging light on multiple viewpoints not less than three, occurrence of crosstalk can be suppressed by designing the image display apparatus so as to satisfy equations (1) and (2).

In the present embodiment, the case has been described in which the first electrodes 45 and 47 are formed so as to be in parallel to the Y axis, the first electrodes 45 and 47 may be formed so as to be tilted by a predetermined angle with respect to the Y axis. Also in this case, occurrence of crosstalk can be reduced as in the present embodiment by designing the image display apparatus so as to simultaneously satisfy equations (1) and (2 with the length equal to half the pitch of the first electrodes 45 and 47 in the X axis direction (horizontal direction) being r. Further, occurrence of moire can also be reduced by tilting the first electrodes 45 and 47 by a predetermined angle with respect to the Y axis.

While in the present embodiment the image display apparatus 10 capable of converging light on each of two viewpoints is exemplary shown, the above-described design conditions can also be applied to an image display apparatus capable of converging light on each of three or more viewpoints. When the image display apparatus can converge light on each of n viewpoints, the above equation (4) can be generalized as shown by the following equation (4') including the setting conditions in the case where the number of viewpoints is two. The following equation (5') is derived from equations (3) and (4'). Using equation (5'), the arrangement pitch of the first electrodes is designed.

$$2r \cdot (OD + f) = m \cdot P \cdot OD \qquad (4')$$

$$r = \frac{m}{2} \cdot \frac{P}{1 + P/PD} \qquad (5')$$

where m: the number of viewpoints,

P: a repetition pitch of a first pixel for displaying a first parallax image, a second pixel for displaying a second parallax image, . . . , and an m-th pixel for displaying an m-th parallax image, r: a length equal to ½ of the arrangement pitch, PD: an interval between adjacent viewpoints, OD: a distance from the center of the liquid crystal lens in the thickness direction thereof to the eyes of the viewer, f: a distance from the center of the liquid crystal lens in the thickness direction thereof to the pixels in the image display panel, and d: a clearance between the opposing substrates, i.e., a thickness (cell gap) of the liquid crystal layer of the liquid crystal lens.

It is noted that m is a natural number representing the number of viewpoints on which the image display apparatus can converge light. Light emitted from each of the first pixel, the second pixel, . . . , and the m-th pixel is converted on each of the m viewpoints (viewpoint_1, viewpoint_2, viewpoint_m), The meaning of the word "pixel" is the same as that described with reference to FIG. 4. Accordingly, the arrangement pitch P of the first pixel, the second pixel, . . . , the m-th pixel is no the arrangement pitch of each pixel provided in the image display panel, but the arrangement pitch of an pixel area where the first pixel is provided, a pixel area where the second pixel is provided, . . . , and a pixel area where the m-th pixel is provided (i.e., the pitch of adjacent pixel areas).

Accordingly, by setting the parameters so as to satisfy the above equations (1) and (2) simultaneously, occurrence of crosstalk can be suppressed also in the image display apparatus having m viewpoints, and thus the light converging characteristics of the image display apparatus can be improved.

EXAMPLE

Hereinafter, an example will be described. First, parameter values of an image display panel according to the example are as follows:

pixel pitch P: 133 μm;

viewing distance OD of the viewer: 350 mm;

the distance PD between the eyes of the viewer: 65 mm;

the pitch of the liquid crystal lens 40 (i.e., a value equal to twice r): 265.5 μm;

the length r equal to half the pitch of the liquid crystal lens 40: 132.7 μm; and the distance f between the lens and the pixels: 0.716 mm.

The pitch of the liquid crystal lens 40 and the length r equal to half the pitch are values obtained from the above equation (5). Generally, a medium such as a glass substrate or an optical film is provided between the liquid crystal lens and the display pixels. When the refractive index of this medium is 1.5, the distance between the liquid crystal lens and the display pixels is 1.07 mm.

Next, the liquid crystal lens 40 will be described in detail.

The pitch of the liquid crystal lens 40 (the pitch of the first electrodes 45 and 47) is 265.5 μm, and the width of each of the first electrodes 45 and 47 formed of chromium is 15 μm. The second electrode 48 formed of Indium Tin Oxide (ITO) is a plane electrode. The cell gap of the liquid crystal is 50 μm.

Further, an elastic coefficient K11 relating to spreading deformation of the liquid crystal layer 43 is 13, an elastic coefficient K22 relating to torsional deformation is 7, and an elastic coefficient K33 relating to bending deformation is 15. In addition, a dielectric constant ε1 of the liquid crystal layer 43 in the director direction is 13, and a dielectric constant ε2 in a direction perpendicular to the director direction is 4. The rotational viscosity of the liquid crystal is 100. A voltage applied to the first electrodes 45 and 47 is set at 5 V, and a voltage applied to the second electrode 48 is set at 0 V.

Liquid crystal orientation simulation based on the finite element method is performed by using the parameters described above.

In the simulation, the direction of the director at each position in the liquid crystal layer is obtained. Based on this information, the refractive index sensed by light at each position in the liquid crystal layer is calculated using the following equation (12):

$$n(\theta) = \frac{n_e \cdot n_o}{\sqrt{n_e^2 \cdot \sin^2\theta + n_o^2 \cdot \cos^2\theta}} \qquad (12)$$

In equation (12), ne is a refractive index of the liquid crystal to extraordinary light, no is a refractive index of the liquid crystal to ordinary light, θ is an angle at which liquid crystal rises when a voltage is applied, namely, an angle formed between the XY plane and the director.

Figure 5:
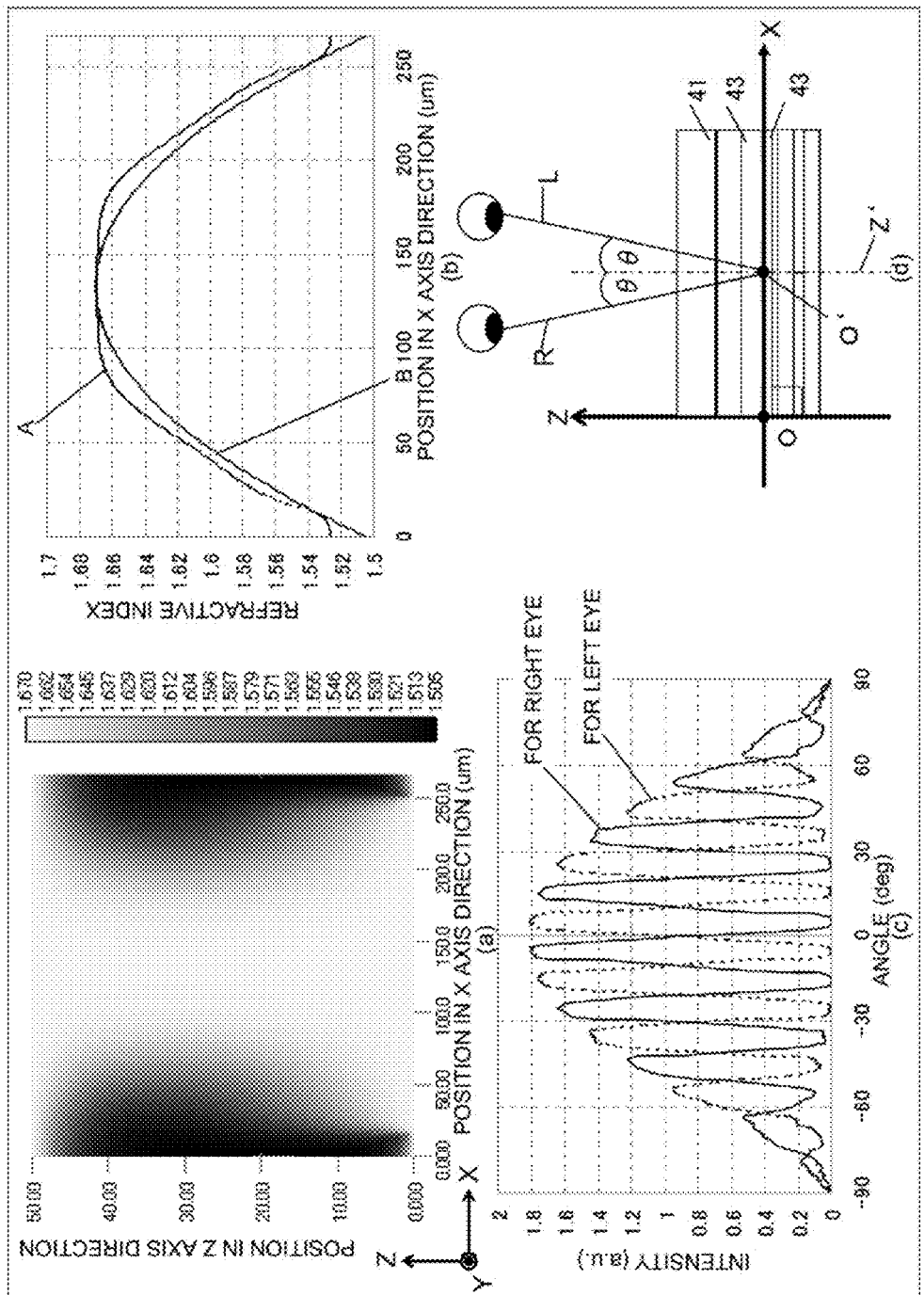
FIG. 5 is a diagram illustrating light converging characteristics of a liquid crystal lens according to an example.

In this example, the refractive index ne of the liquid crystal layer 43 to extraordinary light is set at 1.670, and the refractive index no to ordinary light is set at 1.505. That is, Δn is 0.165. FIG. 5 shows optical characteristics of the example.

FIG. 5(a) is a schematic diagram showing, by shading of color, a change in the refractive index in the liquid crystal lens 40 of the example. In FIG. 5(a), the vertical axis shows the thickness of the liquid crystal lens 40 in the Z axis direction, namely, the cell gap d, and the horizontal axis shows positions in the X axis direction between the first electrodes 45 and 47.

Definition of the vertical axis (Z axis) and the horizontal axis (X axis) in FIG. 5(a) will be described with reference to FIG. 5(d). FIG. 5(d) is a diagram obtained by applying the vertical axis and the horizontal axis of FIG. 5(a) to the schematic diagram of FIG. 3 showing the liquid crystal lens 40. As shown in FIG. 5(d), the horizontal axis (X axis) corresponds to the position of the interface between the liquid crystal layer 43 and the opposing substrate 41. The vertical axis (Z axis) corresponds to the position of the left end of the liquid crystal lens 40. The intersection of the vertical axis (Z axis) and the horizontal axis (X axis) is an origin O.

In FIG. 5(a), a light-colored portion (white portion) indicates an area where the refractive index is relatively high, and a dark-colored portion (black portion) indicates an area where the refractive index is relatively low.

FIG. 5(b) shows a graph obtained by averaging the refractive indices in the Z axis direction at the respective positions in the horizontal axis (X axis) in the refractive index distribution shown in FIG. 5(a). Like the horizontal axis of FIG. 5(a), the horizontal axis of FIG. 5(b) shows positions in the liquid crystal lens 40 along the X axis direction.

FIG. 5(b) shows a graph A indicating the refractive index distribution of the example, and a graph B indicating a refractive index distribution of an ideal GRIN lens (refractive index distribution lens). As shown in the graph B, the refractive index distribution of the ideal GRIN lens is shown by a quadratic curve. It has conventionally been thought that the graph based on the design is desirably close to the ideal graph. However, in this example, as shown in FIG. 5(b), the shape of the graph A is slightly different from the shape of the ideal graph B. The correlation coefficient of the graph A of the example to the ideal graph B is 0.9948. It is found that the distribution of the graph A can suppress occurrence of crosstalk when the viewing distance is long.

The correlation coefficient will be described. When there are N pieces of data X={X1, X2, X3, . . . , XN} and N pieces of data Y={Y1, Y2, Y3, . . . , YN} and then if the averages of X and Y are represented by Xave and Yave, respectively, the correlation coefficient is expressed by the following formula (13):

$$\frac{\sum_{i=1}^{N}(X_i - X_{ave})(Y_i - Y_{ave})}{\sqrt{\sum_{i=1}^{N}(X_i - X_{ave})^2}\sqrt{\sum_{i=1}^{N}(Y_i - Y_{ave})^2}} \quad (13)$$

When X and Y agree with each other, the correlation coefficient is 1. The closer to 1 the correlation coefficient is, the stronger the correlation is.

In the present example, the correlation coefficient is obtained by substituting the refractive index of the example for X and the ideal refractive index for Y.

FIG. 5(c) is a graph showing the result of calculating light distribution characteristics after light has passed through the liquid crystal lens 40, by using the refractive index distribution shown in FIG. 5(a). In FIG. 5(c), a graph shown by a solid line indicates light for the right eye of the viewer, and a graph shown by a dashed line indicates light for the left eye of the viewer. The vertical axis of FIG. 5(c) shows the intensity of light, and the horizontal axis indicates the angle of light emitted from the liquid crystal lens 40. Definition of an angle θ will be described with reference to FIG. 5(d). As shown in FIG. 5(d), a point of intersection between the X axis and a line segment Z' that passes the center of the liquid crystal lens 40 and extends in the Z axis direction is an origin O'. A line segment connecting the origin O' with the right eye of the viewer is a line segment R, and a line segment connecting the origin O' with the left eye of the viewer is a line segment L. One of an angle formed between the line segment Z' and the line segment R (an angle formed between the line segment Z' and the line segment L), which is more acute than the other, is defined as an angle θ. When the line segment Z' is used as a reference, the viewer's right eye side is defined as a negative direction, and the viewer's left eye side is defined as a positive direction.

A light beam tracking simulation is performed with the light distribution characteristics of the light source being Lambertian, the wavelength of the light source being 550 nm, and the light source being located at the position of the right-eye pixels. Next, the position of the light source is shifted to the position of the left-eye pixels, and a light beam tracking simulation is performed again.

Since the viewing distance OD of the viewer is 350 mm and the distance PD between the eyes of the viewer is 65 mm, the angle θ formed between the line segment Z' and the line segment R (right eye) is −5.3°. That is, the right eye of the viewer is located at the position where the angle θ is −5.3°. In the graph shown by a dashed line in FIG. 5(c), if the intensity of the light for the left eye (the dashed-line graph) is measured when the angle θ is −5.3°, in other words, if the light for the left eye enters the right eye of the viewer, the light causes crosstalk. The crosstalk is indicated by a ratio of a noise component to a normal component. In the present example, the intensity of the light for the right eye which enters the right eye of the viewer is the normal component, and the intensity of the light for the left eye which enters the right eye of the viewer is the noise component.

As shown in FIG. 5(c), when the angle θ is 5.3°, the intensity of the light for the right eye (solid line) is 1.8, and the intensity of the light for the left eye (dashed line) is 0. Therefore, the ratio of the noise component to the normal component is 0% because 0/1.81=0. That is, crosstalk that occurs in the liquid crystal lens 40 of the example is 0%.

Further, the angle θ formed between the line segment Z' and the line segment L (left eye) is +5.3°. As is apparent from FIG. 5(c), also when the angle θ is +5.3°, the light for the right eye does not enter the left eye. That is, crosstalk to the left eye of the viewer does also not occur.

In the present example, f=0.716 mm=716 μm, and P=133 μm. Therefore, the present example satisfies the above equation (1).

Further, since Δn is 0.165 and $r^2/(2d \cdot f)$ is 0.244 in the present example, the present example satisfies the above equation (2).

Accordingly, it is confirmed that the image display apparatus of the present example suppresses crosstalk.

COMPARATIVE EXAMPLE

Next, a comparative example will be described.

A liquid crystal lens of the comparative example is different from the liquid crystal lens of the above example in that it does not satisfy equation (2). The parameter values of the image display panel of the comparative example are identical to those of the example. The pitch of the liquid crystal lens, the electrode width, and the cell gap are also identical to those of the example.

Further, an elastic coefficient K11 relating to spreading deformation of the liquid crystal layer 43 is 12, an elastic coefficient K22 relating to torsional deformation is 7, and an elastic coefficient K33 relating to bending deformation is 20. In addition, a dielectric constant $\epsilon_1$ of the liquid crystal layer 43 in the director direction is 9, and a dielectric constant $\epsilon_2$ in a direction perpendicular to the director direction is 4. The rotational viscosity of the liquid crystal is 182. A voltage applied to the first electrodes 45 and 47 is set at 7 V, and a voltage applied to the second electrode 48 is set at 0 V.

A liquid crystal orientation simulation using the finite element method is performed by using the parameters shown above, and further, calculation of a refractive index is performed.

Figure 6:
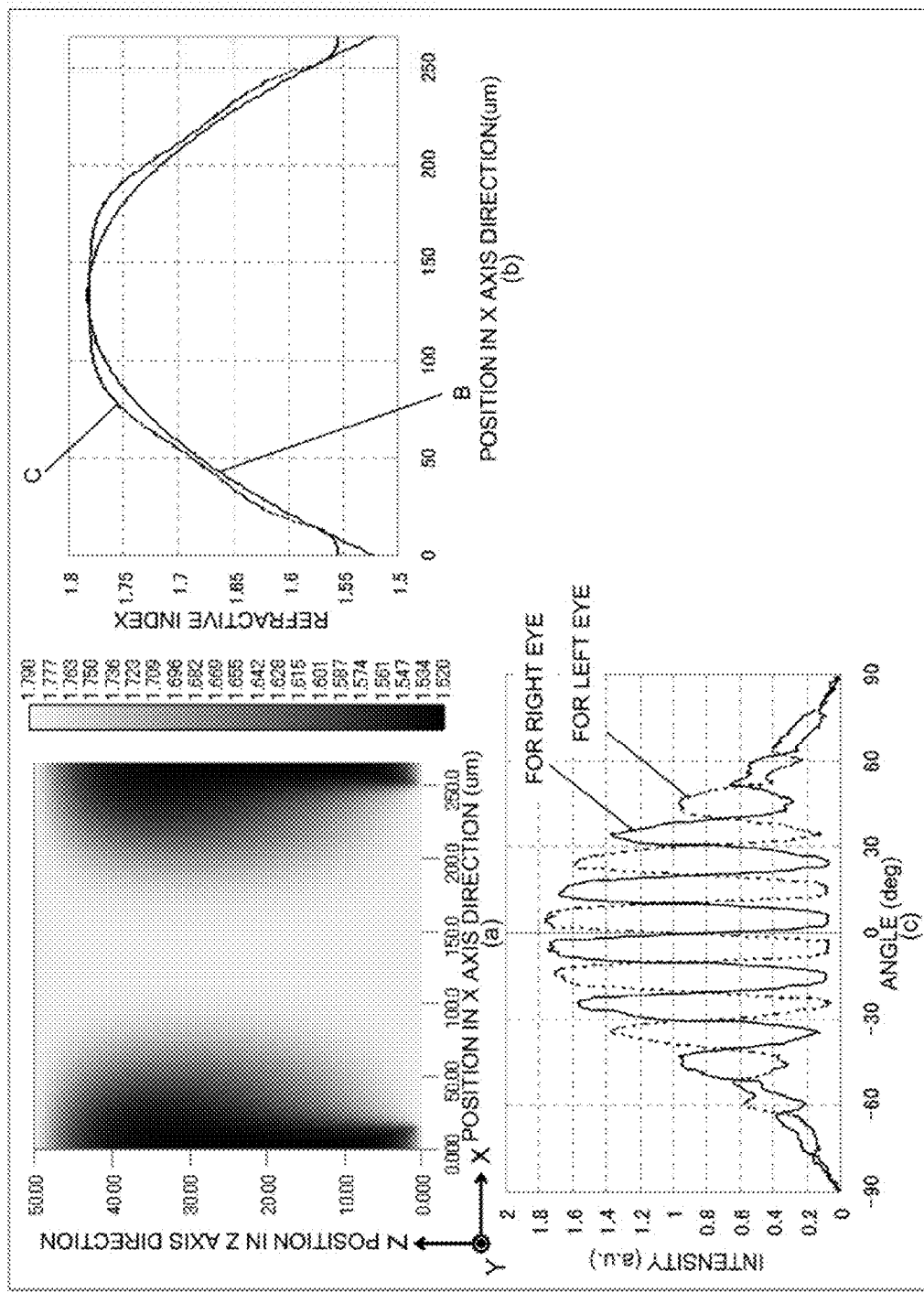
FIG. 6 is a diagram illustrating light converging characteristics of a liquid crystal lens according to a comparison example.

In the comparative example, the refractive index ne of the liquid crystal layer 43 to extraordinary light is 1.79, and the refractive index no to ordinary light is 1.52. That is, Δn is 0.27. FIG. 6 shows optical characteristics of the comparative example.

FIG. 6(a) is a schematic diagram showing, by shading of color, a change in the refractive index in the liquid crystal lens of the comparative example. Since definitions of the vertical axis and the horizontal axis in FIG. 6(a) are identical to those for FIG. 5(a), repeated description is omitted. It is found from FIG. 6(a) that the liquid crystal lens of the comparative example has refractive index distribution when a voltage is applied.

FIG. 6(b) shows a graph obtained by calculating an average value in the Z direction with respect to the refractive index distribution shown in FIG. 6(a). FIG. 6(b) shows a graph C indicating the distribution of the comparative example, and a graph B indicating a distribution of an ideal GRIN lens (refractive index distribution lens). The graph B is identical to the graph B shown in FIG. 5(b).

The degree of correlation between the graph C of the comparative example and the ideal graph B is 0.9965, which is higher than the correlation coefficient of the example.

However, crosstalk occurs in the liquid crystal lens of the comparative example as described below.

FIG. 6(c) is a graph showing a result of calculating light distribution characteristics after light has passed through the liquid crystal lens, by using the refractive index distribution shown in FIG. 6(a).

Like in the example, a light beam tracking simulation is performed with the light distribution characteristics of the light source being Lambertian, the wavelength of the light source being 550 nm, and the light source being located at the position of the right-eye pixels. Next, the position of the light source is shifted to the position of the left-eye pixels, and a light beam tracking simulation is performed again.

Since the viewing distance OD of the viewer is 350 mm and the distance PD between the eyes of the viewer is 65 mm, the angle θ formed between the Z axis and the line segment R (right eye) is −5.3°. As shown in FIG. 6(c), When the angle θ is −5.3°, the intensity of the light for the right eye (solid line) is 1.71, and the intensity of the light for the left eye (dashed line) is 0.076. Therefore, the ratio of a noise component to a normal component is 4.4% because 0.076/1.71=0.044. That is, crosstalk occurs in the liquid crystal lens of the comparative example.

In the comparative example, the values of f and F are identical o those of the example. Therefore, the comparative example satisfies equation (1).

However, since Δn is 0.27 and $r^2/(2d-f)$ is 0.244 in the comparative example, the comparative example does not satisfy equation (2).

As described above, when equation (2) is not satisfied whereas equation (1) is satisfied, occurrence of crosstalk is recognized. The reason is thought to be as follows. Since the refractive index near the first electrodes 45 and 47 greatly changes when Δn of the liquid crystal is large, light incident near the first electrodes 45 and 47 is not refracted in a desired direction, but becomes a crosstalk component.

The present disclosure is applicable to a display apparatus capable of 3D display. Specifically, the present disclosure is applicable to a television, a monitor, a tablet PC, a digital still camera, a movie, a camera-equipped cellular phone, a smartphone, and the like.

What is claimed is:

1. An image display apparatus comprising:
a display panel having, at least, first pixels that display a first parallax image and second pixels that display a second parallax image; and
an image conversion element configured to deflect, in a predetermined direction, light outputted from the display panel, wherein
the image conversion element comprises:
a plurality of first electrodes arranged at a predetermined pitch;
a second electrode disposed so as to oppose the first electrodes; and
a liquid crystal layer which is disposed between the first electrodes and the second electrode and is composed of liquid crystal molecules having an isotropic refractive index, the liquid crystal layer having a refractive index which varies when an arrangement direction of the liquid crystal molecules along a longitudinal direction thereof is changed due to an electric field formed between the first electrodes and the second electrode, and
the image display apparatus simultaneously satisfies the following conditions:

$$f \geq 5P \quad (1)$$

$$\Delta n < \frac{r^2}{2d \cdot f} \quad (2)$$

where
f is a distance (mm) from the liquid crystal aye to the first pixels or the second pixels,
r is a length (mm) equal to ½ of an arrangement pitch of the first electrodes,
Δn is a birefringence of the liquid crystal molecules,
P is an arrangement pitch (mm) of the first pixels and the second pixels, and
d is a thickness (mm) of the liquid crystal layer.

2. The image display apparatus according to claim 1, further comprising a control section configured to control voltages applied to the first electrodes and the second electrode, wherein
the display panel is switchable between 2D display and 3D display, and
when the display panel performs 3D display, the control section applies a voltage across the first electrodes and the second electrode to change the arrangement of the liquid crystal molecules in the liquid crystal layer, thereby causing the liquid crystal layer to act as a lens.

* * * * *